(12) United States Patent
Sakaguchi et al.

(10) Patent No.: US 9,970,539 B2
(45) Date of Patent: May 15, 2018

(54) SHIFT POSITION SWITCH CONTROLLER

(71) Applicants: DENSO CORPORATION, Kariya, Aichi-pref. (JP); HONDA MOTOR CO., LTD., Tokyo (JP)

(72) Inventors: Koji Sakaguchi, Kariya (JP); Masayoshi Iwata, Wako (JP); Yuichiro Takemori, Wako (JP); Taizo Mori, Wako (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/428,436

(22) Filed: Feb. 9, 2017

(65) Prior Publication Data

US 2017/0234423 A1 Aug. 17, 2017

(30) Foreign Application Priority Data

Feb. 12, 2016 (JP) .................................. 2016-25154

(51) Int. Cl.

| F16H 61/32 | (2006.01) |
|---|---|
| F16H 59/10 | (2006.01) |
| H02P 3/06 | (2006.01) |
| H02P 6/08 | (2016.01) |
| F16H 61/28 | (2006.01) |

(52) U.S. Cl.
CPC ........... *F16H 61/32* (2013.01); *F16H 59/105* (2013.01); *H02P 3/06* (2013.01); *H02P 6/08* (2013.01); *F16H 2061/283* (2013.01); *F16H 2061/2823* (2013.01); *F16H 2061/326* (2013.01)

(58) Field of Classification Search
None
See application file for complete search history.

(56) References Cited

U.S. PATENT DOCUMENTS

| 9,416,868 | B2* | 8/2016 | Yatou | F16H 59/105 |
| 9,843,277 | B2* | 12/2017 | Yamada | H02P 6/34 |
| 2005/0174084 | A1 | 8/2005 | Nakai et al. | |
| 2007/0296372 | A1* | 12/2007 | Hori | H02P 1/163 318/716 |
| 2013/0175963 | A1* | 7/2013 | Yamada | H02P 3/08 318/468 |
| 2016/0102761 | A1* | 4/2016 | Kuwahara | F16H 61/24 74/473.12 |

* cited by examiner

*Primary Examiner* — Dirk Wright (74) *Attorney, Agent, or Firm* — Nixon & Vanderhye P.C.

(57) ABSTRACT

A shift position switch controller includes a reference position learner, learning a reference rotation position of an electric motor in a reference shift position, a target position setter, while setting a target rotation position based on an absolute rotation position detected by an absolute position detector until a satisfaction of a first condition, which is an initialization of a learned reference rotation position in the reference shift position or a second condition, which is a post-switch shift position being set as the reference shift position in a shift position switch instruction that is input after the initialization of the learned reference rotation position, and setting the target rotation position based on a rotation position that is detected by a rotation position detector with reference to the reference rotation position serving as a rotation start position.

5 Claims, 10 Drawing Sheets

| CONDITION | DETAILS |
|---|---|
| C1 | $\theta m0$ INITIALIZED IN REF. SHIFT POS. |
| C2 | INPUTTED POST-SWITCH SHIFT POS. AFT $\theta m0$ INITIALIZATION IS REF. SHIFT POS. |

SHIFT POSITION SWITCH CONTROLLER

CROSS REFERENCE TO RELATED APPLICATION

The present application is based on and claims the benefit of priority of Japanese Patent Application No. 2016-025154, filed on Feb. 12, 2016, the disclosure of which is incorporated herein by reference.

TECHNICAL FIELD

The present disclosure generally relates to a shift position switch controller for switching shift positions of an automatic transmission.

BACKGROUND INFORMATION

Conventionally, a shift position switch controller performs a switch control of an automatic transmission for a switching between a plurality of shift positions, according to an absolute rotation position of an output shaft that is rotated/driven by an electric motor via a rotation transmission mechanism.

A patent document, Japanese Patent No. 4385768 (patent document 1), for example, discloses such a shift position switch controller, in which a rotation position of the electric motor is controlled toward a target rotation position based on a detected position that is detected by an encoder. In such control of the rotation position toward the target rotation position, the target rotation position is set based on (i) an absolute rotation position of the output shaft detected by an output shaft sensor and (ii) the rotation position of the electric motor detected by the encoder. In such manner, the deterioration of accuracy of the shift position switch control due to a play/backlash of the rotation transmission mechanism is reduced.

However, the absolute rotation position of the output shaft detected by the output shaft sensor in the patent document 1 is prone to include an error that is caused by an installation position shift of the output shaft sensor, a variation of temperature characteristics of the sensor element, and the like. Thus, the rotation position of the electric motor controlled toward the target rotation position based on such an error-prone absolute rotation position is also prone to include an error. As a result, the rotation position of the electric motor may overshoot/undershoot the target rotation position, leading to the deterioration of accuracy of the shift position switch control.

Addressing such a problem, by (a) learning a reference rotation position in a certain reference shift position among a plurality of shift positions of the automatic transmission and (b) detecting a rotation position of the electric motor based on such a reference rotation position, which serves as a rotation start position, the rotation position of the electric motor minimizes the above-described error in the absolute rotation position of the output shaft. However, until an initialization of the learn position of the reference rotation position in the certain reference shift position, or until an input of a post-switch shift position in a shift position switch instruction after the initialization of the learn position being set as the reference shift position, the reference rotation position cannot be learned. As a result, based on a pre-learn reference rotation position, which is a rotation start position before accurate learning of the reference rotation position, the rotation position of the electric motor still either overshoots or undershoots in a rotation control toward the target rotation position thereby highly probably causing deteriorated accuracy in the shift position switch control. More specifically, the target rotation position of the shift position switch controller in the patent document 1 is under an influence of the absolute rotation position of the output shaft, which increases the degree of deterioration of accuracy of the shift position switch control.

SUMMARY

It is an object of the present disclosure to provide a shift position switch controller that is capable of securing accuracy of the shift position switch control.

In the following, an inventive technique for solving the above-described problem is described. The numerals in the claims and in the summary are only for showing relationships between the claim elements and the components described later in the embodiments, thereby not necessarily limiting the technical scope of the following disclosure.

In an aspect of the present disclosure, a shift position switch controller that performs a switch control a transmission, including a rotation position detector detecting a rotation position of an electric motor, an absolute rotation position detector detecting an absolute rotation position of an output shaft, a reference position learner learning a reference rotation position of the electric motor in a reference shift position, the reference shift position being one of a plurality of shift positions, a target position setter that (A) sets a target rotation position of the electric motor according to a shift position switch instruction that is based on the absolute rotation position detected by the absolute rotation position detector, until a satisfaction of a first condition or a second condition, and (B) sets the target rotation position according to a shift position switch instruction that is based on the rotation position that is detected by the rotation position detector, with reference to the reference rotation position serving as a rotation start position, after the satisfaction of the first condition or the second condition. The first condition is defined as an initialization of a learned reference rotation position learned by the reference position learner in the reference shift position, and the second condition is defined as a post-switch shift position being set as the reference shift position in the shift position switch instruction that is input after the initialization of the learned reference rotation position. The shift position switch controller also includes a rotation controller controlling the rotation position of the electric motor toward the target rotation position, based on a detected rotation position detected by the rotation position detector.

According to the above-described aspect of the present disclosure, until the satisfaction of the first condition, which is an initialization of a learned reference rotation position learned by the reference position learner in the reference shift position, the target rotation position of the electric motor is set based on the absolute rotation position of the output shaft detected by the absolute rotation position detector. Further, until the satisfaction of the second condition, which is a post-switch shift position being set as the reference shift position in the shift position switch instruction that is input after the initialization of the learned reference rotation position, the target rotation position is set based on the absolute rotation position of the output shaft detected by the absolute rotation position detector. In the above-described manner, until the reference rotation position is accurately learnable as a rotation start position, the rotation position of the electric motor is controlled toward the target rotation position based on the detected absolute rotation position. Therefore, an amount of the overshoot/undershoot of the rotation position of the electric motor relative to the target rotation position is controlled to the minimum.

Further, after the satisfaction of the first condition or the second condition, the target rotation position of the electric motor is set based on the detected rotation position of the electric motor detected by the rotation position detector with reference to the reference rotation position serving as a rotation start position. In such manner, after an accurate reference rotation position is learnable as a rotation start position, the rotation position of the electric motor is controlled toward the target rotation position based on the detected rotation position which is now accurately detectable due to the accurate reference rotation position. Therefore, the overshoot/undershoot of the rotation position of the electric motor relative to the target rotation position is securely prevented.

Based on the above, the technique and the controller described in the present disclosure enable an accurate control of the rotation position of the electric motor toward the target rotation position, for securing accuracy of the shift position switch control.

Further, in another aspect of the present disclosure, the rotation control section regulates a rotation speed of the electric motor under a regulated speed (Vml) until the satisfaction of the first condition or the second condition. That is, a rotation speed before (i.e., until) the satisfaction of the first/second condition, i.e., the regulated speed (Vml), is lower than a rotation speed after the satisfaction of the first condition or the second condition.

In such aspect of the disclosure, the electric motor rotated at a lower speed until the satisfaction of the first or second condition, i.e., at the regulated speed that is lower than the rotation speed after the satisfaction of the condition, is easily controllable toward the target rotation position. Therefore, the amount of the overshoot/undershoot relative to the target rotation position is easily controllable to the minimum, which facilitates securing of accuracy of the shift position switch control.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiments of the present disclosure are described based on the drawings. The same component/configuration has the same numeral in those embodiments, for the brevity of description, i.e., for not repeating the description of the same component/configuration. The embodiment may be partially described, borrowing the rest from the other embodiment(s). A combination of the embodiments may either be explicitly or implicitly described allowable, unless otherwise described.

First Embodiment

Figure 1:
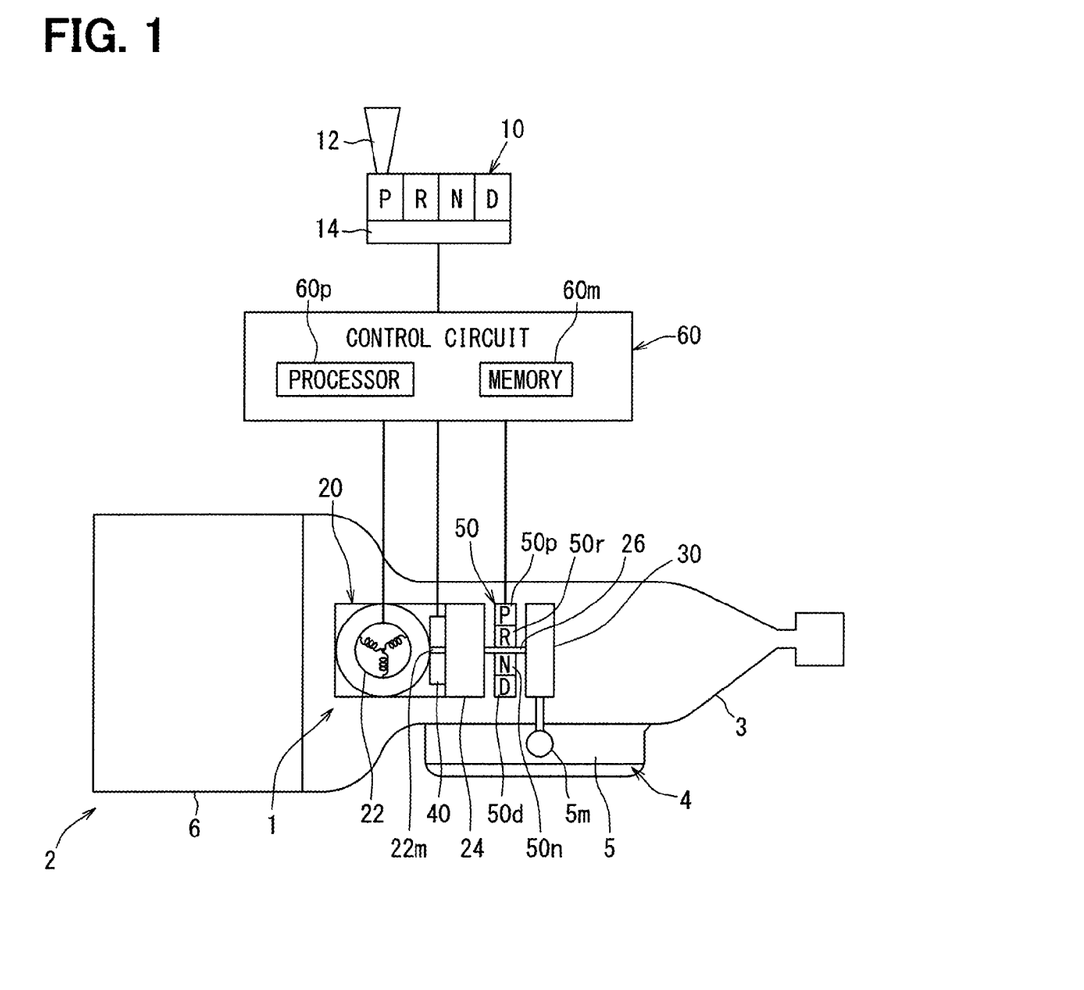
FIG. 1 is a block diagram of a shift-by-wire system including a shift position switch controller in a first embodiment of the present disclosure.

As shown in FIG. 1, a shift position switch controller 1 in the first embodiment of the present disclosure is applied to a shift-by-wire system 2 of a vehicle, and controls an automatic transmission 3. The shift-by-wire system 2 is provided with a gear controller 4 together with the shift position switch controller 1.

Figure 2:
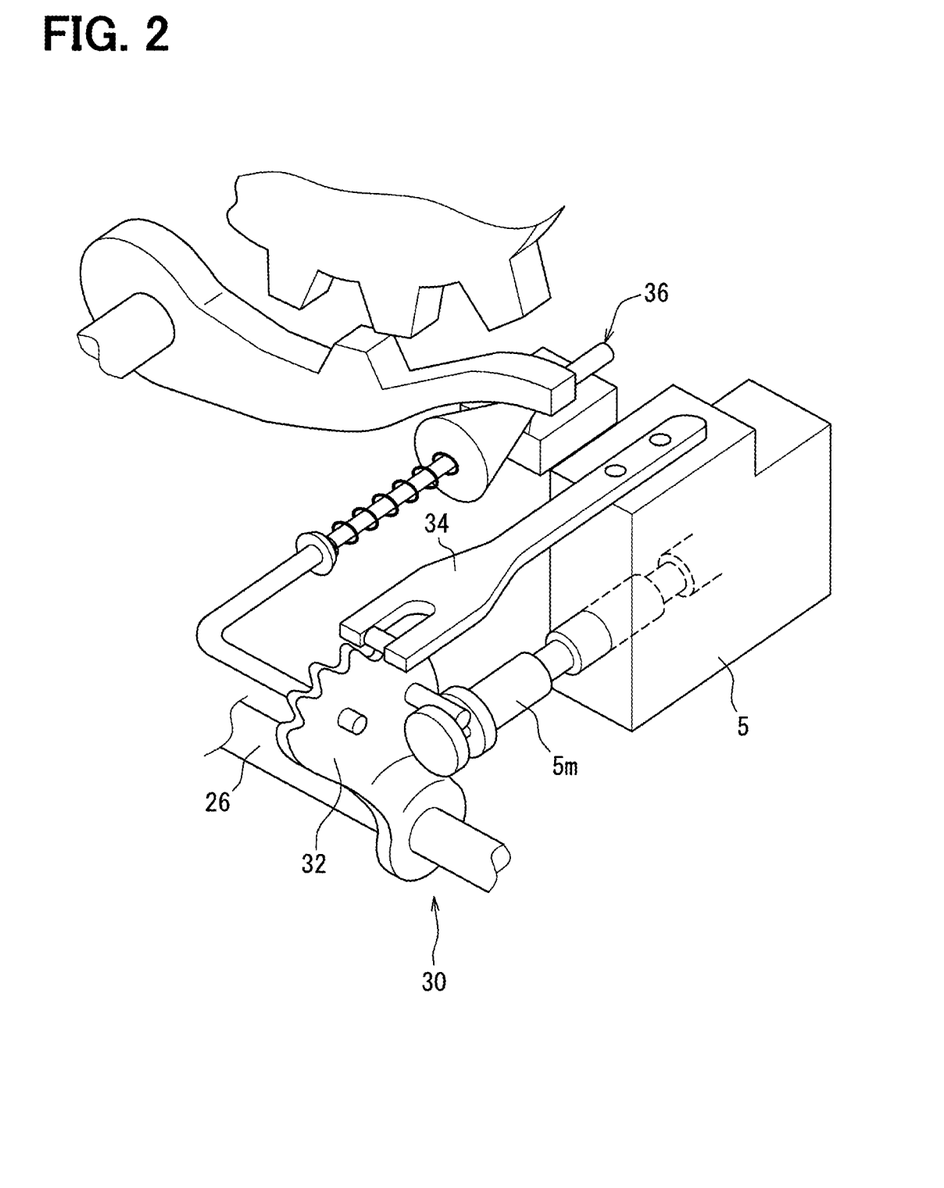
FIG. 2 is a perspective view of a conversion mechanism in the first embodiment of the present disclosure.

The gear controller 4 is configured to include a hydraulic circuit 5. As shown in FIG. 2, a manual valve 5m of the hydraulic circuit 5 is a spool valve provided with a spool, which performs a straight-line/translational movement. The manual valve 5m switches the shift position and the gear ratio of the automatic transmission 3 by driving the automatic transmission 3, i.e., by the output of oil pressure according to the position of the spool.

The automatic transmission 3 in the present embodiment is provided with two shift positions for the travel of the vehicle, i.e., D position (i.e., a drive position) and R position (i.e., a reverse position) for a forward travel and a backward travel of the vehicle, for a transmission of rotation output from an engine 6 of the vehicle to a driving wheel as shown in FIG. 1. Further, two shift positions for not transmitting the engine output to the driving wheel are provided as P position and N position, i.e., a park position and a neutral position.

The shift position switch controller 1 is provided with a shift position selector 10, a shift actuator 20, a conversion mechanism 30, a rotation position detector 40, an absolute rotation position detector 50, and a control circuit 60.

The shift position selector 10 is configured to include a shift lever 12 and a shift sensor 14.

The shift lever 12 of the shift position selector 10 is operated by an occupant sitting on the driver's seat in the vehicle. The shift lever 12 has setting of post-switch shift positions, i.e., P, R, N, or D position, for the input of a shift position switch instruction, and the shift lever 12 is operated to one of those positions.

The shift sensor 14 may be a contact sensor or the like, for example, and detects the operation position of the shift lever 12. The shift sensor 14 outputs a detection signal indicative of a detected operation position of the shift lever 12, for the input of the shift position switch instruction, i.e., to switch the shift position to P, R, N, or D position, from the occupant of the vehicle by the operation of the shift lever 12.

The shift actuator 20 is configured to include an electric motor 22, a rotation transmission mechanism 24, and an output shaft 26.

The electric motor 22 is a synchronous motor, e.g. a switched-reluctance motor, for example. The electric motor 22 rotates a motor shaft 22m to a control position at a control speed.

Figure 4:
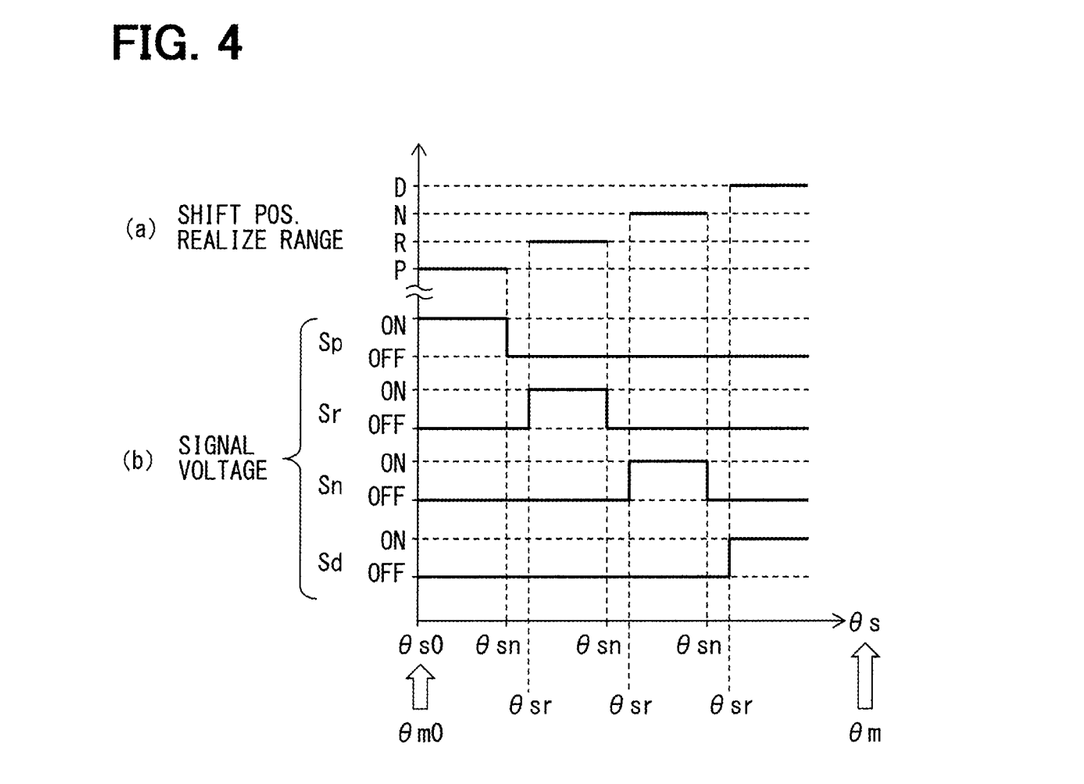
FIG. 4 is a diagram of characteristic operations of an absolute rotation position detector in the first embodiment of the present disclosure.

The rotation transmission mechanism 24 is primarily provided as a speed reduction mechanism together with other parts, for connecting the motor shaft 22m and the output shaft 26. The rotation transmission mechanism 24 reduces a rotation speed of the motor shaft 22m, and transmits the rotation of the motor 22 to the output shaft 26. As the result, as shown in FIG. 4 by a white arrow, the output shaft 26 is rotated to an absolute rotation position θs by the drive of the motor 22, which corresponds to a rotation position θm of the motor shaft 22m.

As shown in FIG. 1, the conversion mechanism 30 is provided at a position between the output shaft 26 and the manual valve 5m. As shown in FIG. 2, the conversion mechanism 30 is configured to include a detent plate 32 and a detent spring 34. The detent plate 32 is rotatable together with the output shaft 26. The detent plate 32 is connected to the spool of the manual valve 5m. The detent plate 32 converts the rotational movement of the output shaft 26 into the straight-line movement of the spool. As a result, the shift position of the automatic transmission 3 is switched according to the change of the position of the spool corresponding to the absolute rotation position θs of the output shaft 26.

Figure 3A:
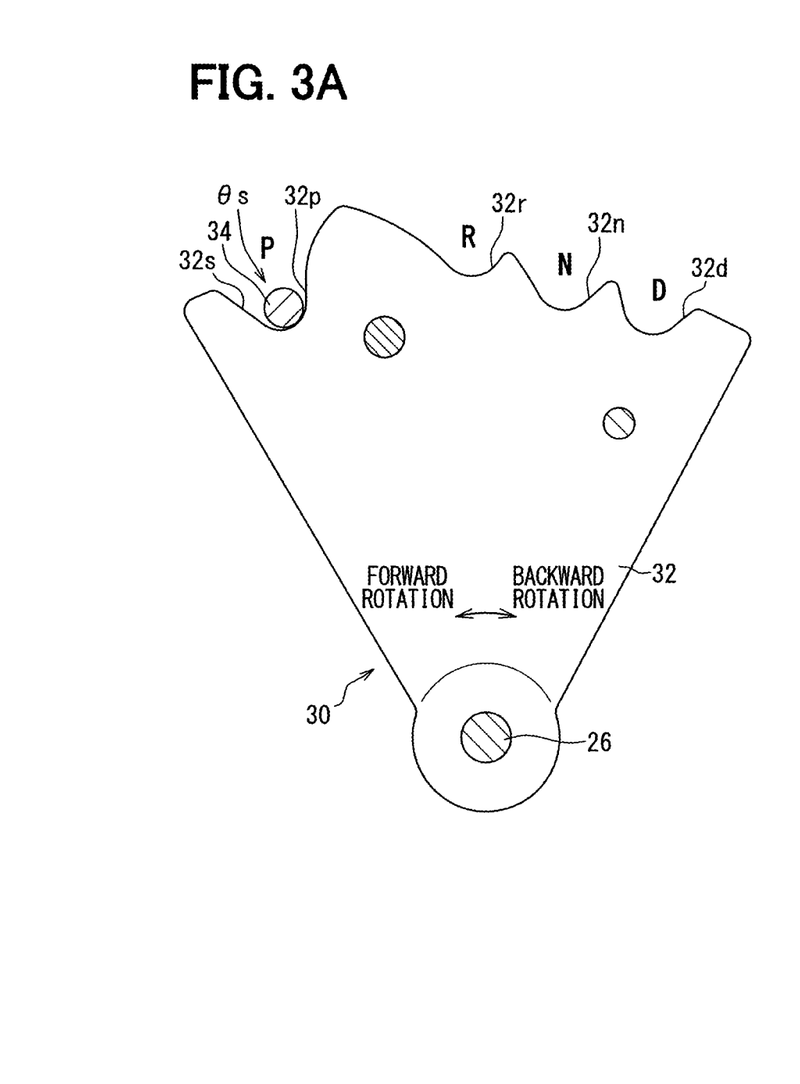
FIG. 3A is an illustration of an operation state of the conversion mechanism in the first embodiment of the present disclosure.
Figure 3B:
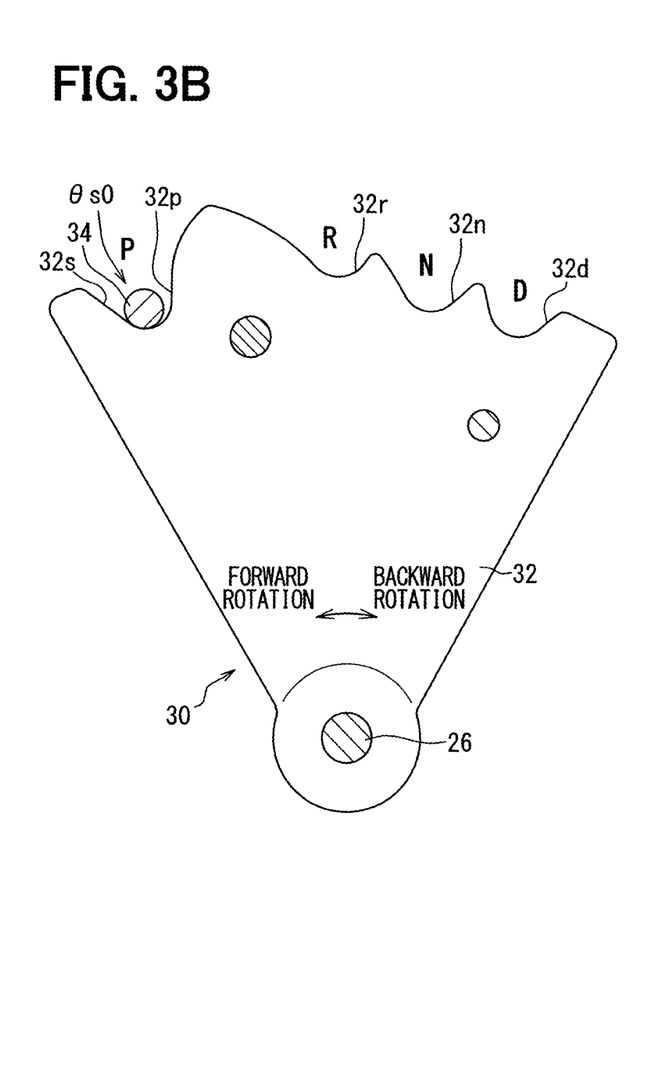
FIG. 3B is another illustration of an operation state of the conversion mechanism in the first embodiment of the present disclosure.

More practically, as shown in FIG. 3, an outer periphery of the detent plate 32 has a plurality of detents 32p, 32r, 32n, and 32d formed thereon at equal intervals along its rotation direction. Those detents 32p, 32r, 32n, and 32d respectively correspond to the shift positions P, R, N, and D, i.e., the post-switch shift positions according to the shift position switch instruction.

The detent spring 34 is configured to engage one of those detents 32p, 32r, 32n, and 32d, as the detent plate 32 rotates according to the absolute rotation position θs of the output shaft 26.

In the above-described configuration of the conversion mechanism 30, P position of the automatic transmission 3 is realized as shown in FIG. 4 when the detent plate 32 is rotated to a certain range of the absolute rotation position θs of the output shaft 26 (i.e., a shift position realize range in FIG. 4), at which position the detent spring 34 engages the detent 32p as shown in FIGS. 3A and 3B.

Within such a range of the absolute rotation position θs, one extreme position θs0 in FIG. 3B is a position where the detent spring 34 engagingly stops, or locks, the rotation of the detent plate 32 by a stopper 32s, which is an inner wall of the detent 32p. The rotation of the motor shaft 22m at such moment is mechanically stopped by the stopper 32s from further rotating in the backward rotation direction, i.e., from rotating toward a far side in FIG. 2. Thus, as shown in FIG. 4 by a while arrow, the rotation position θm corresponding to the one extreme position θs0 is set, i.e., defined, as a reference rotation position θm0.

Further, P position realized by the above-described range of the absolute rotation position θs, including the one extreme position θs0, is now defined as a reference shift position. Further, within a range of the rotation position θm corresponding the range of the absolute rotation position θs realizing P position, a "middle" position in FIG. 3A, which is a rotated position just a little bit rotated from the reference rotation position θm0 in the forward rotation direction, is defined as a stable control position where the detent 32p stably engages the detent spring 34.

Note that, in the conversion mechanism 30 shown in FIG. 3, a lock to the driving wheel of the vehicle is realized by a park lock mechanism 36 at P position.

In other ranges of the absolute rotation position θs realizing R, N, or D position in FIG. 4, the detent spring 34 engages the detent 32r, 32n, or 32d, respectively. Thus, a middle point of each of those ranges of the rotation position θm, which corresponds to the absolute rotation position θs of R, N, or D position, is also defined as a stable control position where the engagement of the detent 32r, 32n, or 32d and the detent spring 34 is stably realized for realizing R, N, or D position.

As shown in FIG. 1, in the present embodiment, the rotation position detector 40 serving as a "rotation position detector" in the claims is a rotary encoder of an incremental type, and is built in the electric motor 22.

When the rotation position θm of the motor shaft 22m changes by an every preset angle, the rotation position detector 40 sets at least one of an A phase signal and a B phase signal to an ON state voltage, and outputs such a signal. As a result, by picking up a rising edge or a falling edge of one of the A and B phase signal, the rotation position θm is detectable by every small preset angle.

In the present embodiment, the absolute rotation position detector 50 serving as an "absolute rotation position detector" in the claims is a rotary position sensor, and is disposed in proximity of the output shaft 26. The absolute rotation position detector 50 is configured to include two or more sensing parts 50p, 50r, 50n, and 50d. Each of the sensing parts 50p, 50r, 50n, and 50d corresponds to a plurality of shift positions, i.e., to P, R, N, and D positions which are the post-switch positions in the shift position switch instruction, respectively.

As shown in FIG. 4, the sensing part 50p, while outputting a detection signal Sp in an ON voltage in the P position range of the absolute rotation position θs of the output shaft 26 which realizes P position, outputs, in other range of the absolute rotation position θs, the detection signal Sp in an OFF voltage.

The sensing part 50r outputs, in the R position range of the absolute rotation position θs which realizes R position, a detection signal Sr in the ON voltage, and outputs, in other range of the absolute rotation position θs, the detection signal Sr in the OFF voltage.

The sensing part 50n outputs, in the N position range of the absolute rotation position θs which realizes N position, a detection signal Sn in the ON voltage, and outputs, in other range of the absolute rotation position θs, the detection signal Sn in the OFF voltage.

The sensing part 50d outputs, in the D position range of the absolute rotation position θs which realizes D position, a detection signal Sd in the ON voltage, and outputs, in other range of the absolute rotation position θs, the detection signal Sd in the OFF voltage.

As a result, by picking up the rising or falling edge in one of the output signals from the sensing parts 50p, 50r, 50n, and 50d, the absolute rotation position θs is detectable as a large discrete angle, i.e., as shown in stepwise graph of FIG. 4.

As shown in FIG. 1, the control circuit 60 is provided primarily as a microcomputer with a processor 60p and a memory 60m. The control circuit 60 is electrically connected with the shift sensor 14, the electric motor 22, the rotation position detector 40, and the absolute rotation position detector 50. The control circuit 60 controls the rotation position θm and a rotation speed Vm (see FIG. 10, for example) of the motor shaft 22m in the electric motor 22 based on the output signal from the sensors 14, 40, and 50.

As a result, according to the absolute rotation position θs of the output shaft 26 corresponding to the rotation position θm, a switch control of the shift positions P, R, N and D is performed in the automatic transmission 3.

Note that the rotation speed Vm means the number of rotations per unit time.

During the switch control, the control circuit 60 detects the rotation position θm of the electric motor 22 with reference to the reference rotation position θm0 that serves as a rotation start position, based on (i) the reference rotation position θm0 of the electric motor 22 and (ii) the A phase signal and the B phase signal that are output from the rotation position detector 40.

More practically, the control circuit 60 learns, by rotating the motor shaft 22m until the rotation of the detent spring 34 is stopped, i.e., locked, by the stopper 32s, the rotation position θm in the locked state as the reference rotation position θm0 in the reference shift position, i.e., in P position. The control circuit 60 sets a rotation count value that is memorized by the memory 60m to a zero value, as a value of the rotation position θm.

After the above-described learning, the control circuit 60 increments or decrements the rotation count value in the memory 60m from the reference rotation position θm0 (i.e., from a zero value), at every edge picked up by the rotation position sensor 40 as the A phase signal or the B phase signal.

When the control circuit 60 rotates the motor shaft 22m in the forward rotation direction, which increases the rotation angle from the reference rotation position θm0, the control circuit 60 increments the rotation count value.

On the other hand, when the control circuit 60 rotates the motor shaft 22m in the backward rotation direction which decreases the rotation angle from the reference rotation position θm0, the control circuit 60 decrements the rotation count value. As a result of the above process, the rotation count value is detected as the rotation position θm, with reference to the reference rotation position θm0 that serves as a rotation start position.

However, the control circuit 60 resets the content of the memory 60m, if a reset condition determined in advance is satisfied.

Thereby, the rotation count value from a learned reference rotation position θm0 is once forcefully returned to a zero value, which substantially means that the reference rotation position θm0 is put in an initialized state in the control circuit 60.

Therefore, until the reference rotation position θm0 is re-learned after such an initialization, a rotation count value from an alternative rotation position is detected as the rotation position θm with reference to the alternative rotation position serving as a rotation start position, which is described later in detail.

Note that, the reset condition of the control circuit 60 for the initialization of the reference rotation position θm0 may include, for example, an OFF operation of a power switch in the vehicle by the occupant of the vehicle, a lowering of the battery power voltage in the vehicle to be lower than a preset value, and the like.

Further, the control circuit 60 of the present embodiment detects the absolute rotation position θs of the output shaft 26, as shown in FIG. 4, based on the detection signals Sp, Sr, Sn, and Sd, which are output from the absolute rotation position detector 50.

More practically, the control circuit 60 picks up the rising edge of detection signals Sr, Sn, and Sd. Thereby, the control circuit 60 detects a backward extreme position θsr of the shift position realize range of the absolute rotation position θs, which is realized as the shift position corresponding to the picked-up detection signal, i.e., the signal Sr, Sn, or Sd from the sensing part 50r, 50n or 50d, that is, either of R, N, or D position.

On the other hand, the control circuit 60 also picks up the falling edge of the detection signals Sp, Sr, and Sn. Thereby, the control circuit 60 detects a forward extreme position θsn of the shift position realize range of the absolute rotation position θs, which realizes the shift position corresponding to the picked-up detection signal, i.e., the signal Sp, Sr, or Sn from the sensing part 50p, 50r or 50n, that is, either of P, R, or N position.

Further, the control circuit 60 picks up the ON voltage of the detection signal Sp, Sr, Sn, or Sd. Thereby, the control circuit 60 detects that the detected absolute rotation position θs is within the shift position realize range of the realizing shift position (i.e., P, R, N, or D position) that is picked up as the ON voltage by the corresponding sensing part 50p, 50r, 50n, or 50d.

(Shift Position Switch Control Flow)

In the following, a shift position switch control, which is realized by executing a control program stored in the memory 60m of the control circuit 60 by the processor 60p of the control circuit 60, is described as a flowchart shown in FIG. 5. The shift position switch control is started when the reference rotation position θm0 is initialized by the satisfaction of the reset condition.

Sign "S" represents a "step" in the flowchart of the control.

The memory 60m memorizing the control program for realizing the shift position switch control and the like is provided as one or more of various storage media such as, for example, a semiconductor memory, a magnetic medium, an optical medium, and the like.

In S101 of the shift position switch control, it is determined whether the current shift position at the start time of the control is P position among a plurality of shift positions P, R, N, and D.

At such time, the current shift position is determined based on the output signals Sp, Sr, Sn and Sd from the absolute rotation position detector 50.

Figure 6:
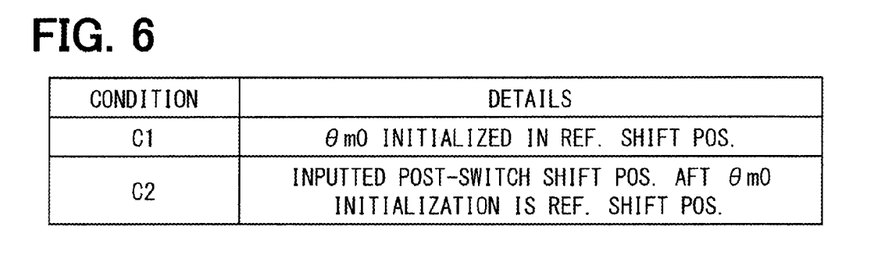
FIG. 6 is a diagram of a first condition and a second condition regarding how those conditions are satisfied in the first embodiment of the present disclosure.

As a result, when an affirmative determination is made in S101, it is determined that a first condition C1 is satisfied. That is, in the present embodiment, as shown in FIG. 6, the first condition C1 is defined as the initialization of the reference rotation position θm0 in P position that serves as a reference shift position.

Figure 5:
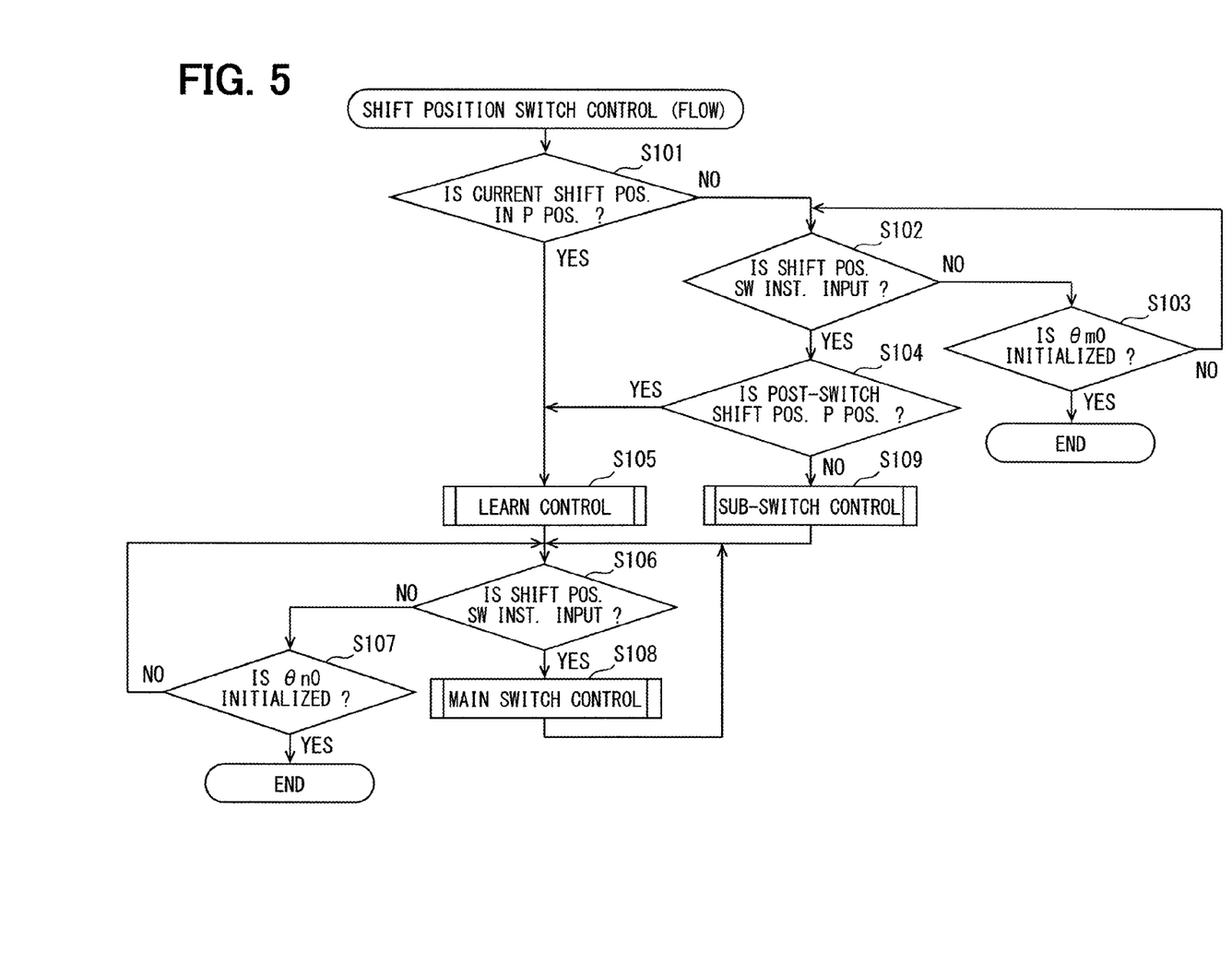
FIG. 5 is a flowchart of a shift position switch control process in the first embodiment of the present disclosure.

As shown in FIG. 5, when a negative determination is made in S101, the process proceeds to S102.

In S102, it is determined whether a shift position switch instruction is inputted.

At such time, whether or not the shift position switch instruction has already been input is determined based on the output signal from the shift sensor 14.

When a negative determination is made in S102, the process proceeds to S103, and it is determined whether the reference rotation position θm0 is initialized based on the satisfaction of the reset condition.

As a result, when an affirmative determination is made in S103, the shift position switch control is complete for a current execution cycle, and the shift position switch control in the next execution cycle is started.

On the other hand, when a negative determination is made in S103, the process returns to S102.

When an affirmative determination is made in S102, the process proceeds to S104, and it is determined whether a post-switch shift position in the shift position switch instruction is P position. The post-switch shift position may be understood as an after-switching shift position in the shift position switch control, or as a post-switch shift position reached by performing the shift position switch control.

At such time, the post-switch shift position is determined based on the output signal from the shift sensor 14.

As a result, when an affirmative determination is made in S104, it is determined that a second condition C2 is satisfied. That is, in the present embodiment, as shown in FIG. 6, the second condition C2 is defined as a condition that the post-switch shift position in the shift position switch instruction that is inputted (i) after the initialization of the reference rotation position θm0, and (ii) when the current shift position is one of the shift positions R, N, and D, i.e., when the current shift position is other than the reference shift position (i.e., P position), is the reference shift position (i.e., P position).

Now, as shown in FIG. 5, when an affirmative determination is made in S101, the process proceeds to S105. Also, when an affirmative determination is made in S104, the process proceeds to S105.

Therefore, in the shift position switch control of the present embodiment, S105 is performed after the satisfaction of the first condition C1 or the second condition C2.

In S105, a learn control of the rotation position θm of the electric motor 22 is performed.

Figure 7:
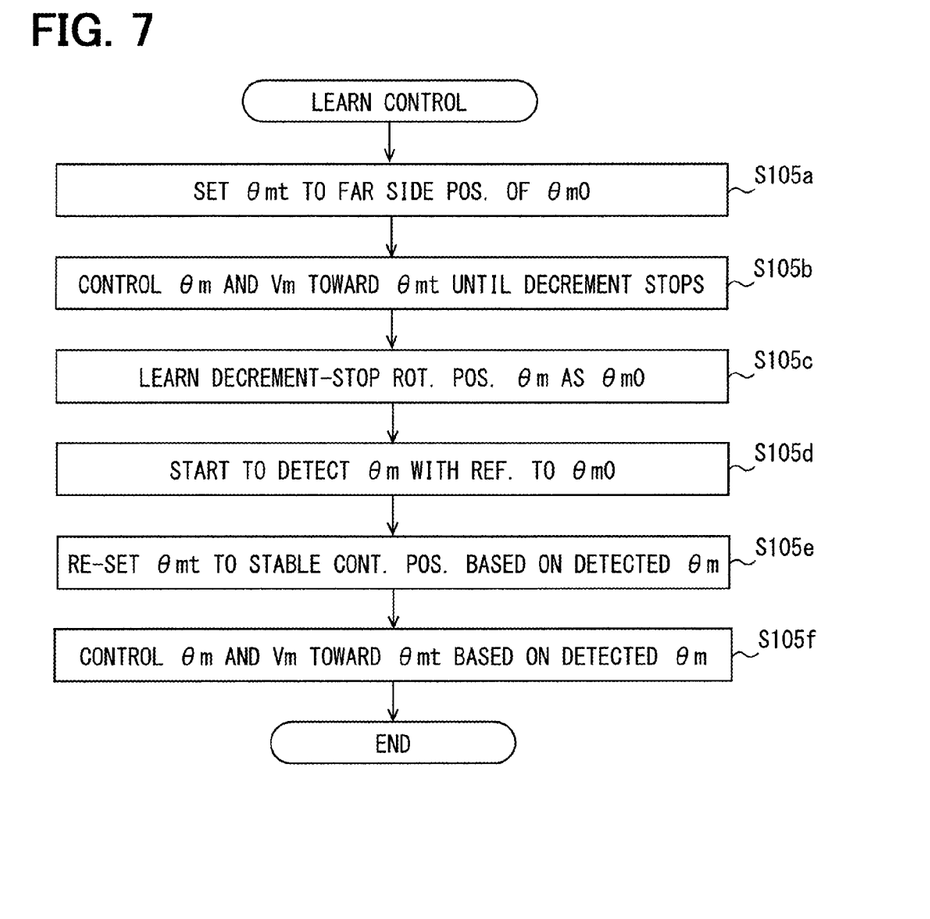
FIG. 7 is a flowchart of a learn control in the first embodiment of the present disclosure.

More practically, in the learn control, a target rotation position θmt is set to a temporary rotation position θm according to the shift position switch instruction in S105a of FIG. 7, which is a position away from the reference rotation position θm0 in the backward rotation direction when seen from the current position, i.e., to a position on a far side of the reference rotation position θm0.

At such time, the current position is typically realized as the farthest position from the reference rotation position θm0, i.e., as D position.

Then, the target rotation position θmt is set as a certain rotation count value that changes, i.e., rotates, the rotation position θm from the assumed current position to a far side position on the far side of the reference rotation position θm0.

Note that S105a described above is performed prior to S105e that is described later in detail as a setting step for setting the target rotation position θmt based on the rotation position θm detected with reference to the reference rotation position θm0 that serves as a rotation start point and S108a.

Next, in S105b of the learn control, the rotation position θm and the rotation speed Vm of the electric motor 22 are controlled toward the target rotation position θmt, until the decrement of the rotation count value based on the output signal from the rotation position detector 40 stops.

At such time, the rotation speed Vm is controlled to a certain speed at which the rotation of the detent plate 32 is stoppable with a low/moderate impact by the engagement of the stopper 32s and the detent spring 34, for example.

As a result of the above-described control, in S105c of the learn control, the rotation position θm when the decrement stops is learned as the reference rotation position θm0. Thereby, the rotation count value in the memory 60m is updated to a zero value.

In subsequent S105d of the learn control, the rotation count value with reference to the reference rotation position θm0 is counted as, i.e., is restarted to be counted as, the rotation position θm, with reference to a rotation start position of θm0.

Then, in S105e of the learn control, the target rotation position θmt according to the shift position switch instruction is re-set to the stable control position in the P position range of the rotation position θm which realizes P position, based on the detected rotation position θm.

At such time, the zero value which is the rotation count value based on the output signal from the rotation position detector 40 is detected as the current rotation position θm, with reference to the reference rotation position θm0 that serves as a rotation start position.

Then, the target rotation position θmt is set as a rotation count value that enables the rotation position θm to reach the stable control position from the detected current position, i.e., from the reference rotation position θm0 detected as the current position.

Then, in S105f of the learn control, the rotation position θm and the rotation speed Vm of the electric motor 22 are controlled toward the target rotation position θmt serving as the stable control position based on the detected rotation position θm.

At such time, the rotation count value that is incremented based on the output signal from the rotation position detector 40 is detected as needed as the current rotation position θm with reference to the reference rotation position θm0 that serves as a rotation start position.

Then, a feedback control about the rotation position θm is performed so that the current position detected as needed may be matched with (i.e., is brought to) the target rotation position θmt. Further, at such timing, the rotation speed Vm is controlled to a normal speed Vmn (e.g., refer to FIG. 10) determined in advance.

In such manner, when the learn control in S105 is complete, the process of the shift position switch control proceeds to S106 as shown in FIG. 5.

In S106, it is determined whether the shift position switch instruction is inputted, similar to S102.

When a negative determination is made in S106, the process proceeds to S107, and it is determined whether the reference rotation position θm0 is initialized based on the satisfaction of the reset condition.

As a result, when an affirmative determination is made in S107, the shift position switch control is completed for a current execution cycle, and the shift position switch control in the next execution cycle is started.

On the other hand, when a negative determination is made in S107, the process returns to S106.

When an affirmative determination is made in S106, the process proceeds to S108, and a main switch control of the rotation position θm is performed for the electric motor 22.

Figure 8:
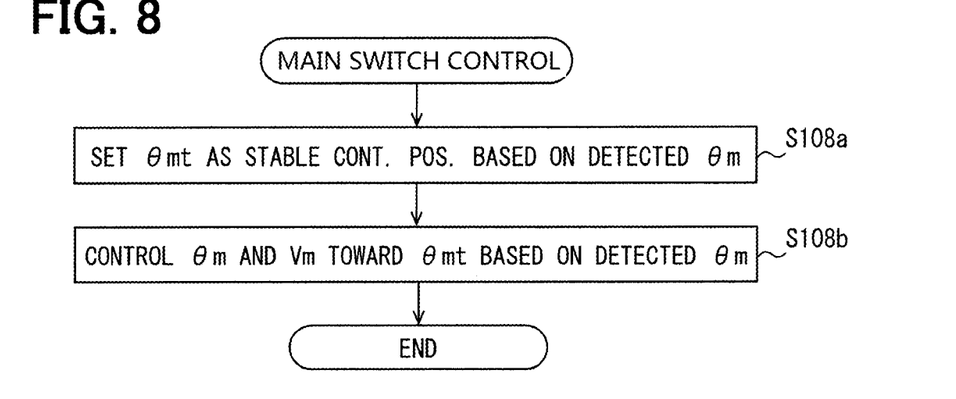
FIG. 8 is a flowchart of a main switch control in the first embodiment of the present disclosure.

More practically, the main switch control in S108a of FIG. 8 sets the target rotation position θmt as the stable control position based on the detected rotation position θm, which is a rotation position in the shift position realize range of the rotation position θm which realizes the post-switch shift position of the shift position switch instruction.

At such time, the rotation count value based on the output signal from the rotation position detector 40 is detected as the current rotation position θm based on the reference rotation position θm0.

Then, the target rotation position θmt is set as the rotation count value which enables the rotation position θm to reach the stable control position from the detected current position.

Next, in S108b of the main switch control, the rotation position θm and the rotation speed Vm of the electric motor 22 are controlled toward the stable control position as the target rotation position θmt based on the detected rotation position θm.

At such time, the rotation count value based on the output signal from the rotation position detector 40 is detected as needed as the current rotation position θm based on the reference rotation position θm0.

Then, a feedback control is performed about the rotation position θm so that the current position detected as needed is matched with (i.e., is brought to) the target rotation position θmt. At such time, the rotation speed Vm is controlled to the same normal speed Vmn as controlled in S105f of the learn control.

In such manner, when the main switch control is complete, the shift position switch control returns to S106 as shown in FIG. 5.

The description so far is about an after process of an affirmative determination in S104.

In the following, an after process of a negative determination in S104 is described.

When a negative determination is made in S104, the process proceeds to S109.

Therefore, in such a shift position switch control, S109 is performed until the first condition C1 or the second condition C2 is satisfied.

In S109, a sub-switch control of the rotation position θm is performed for the electric motor 22.

Figure 9:
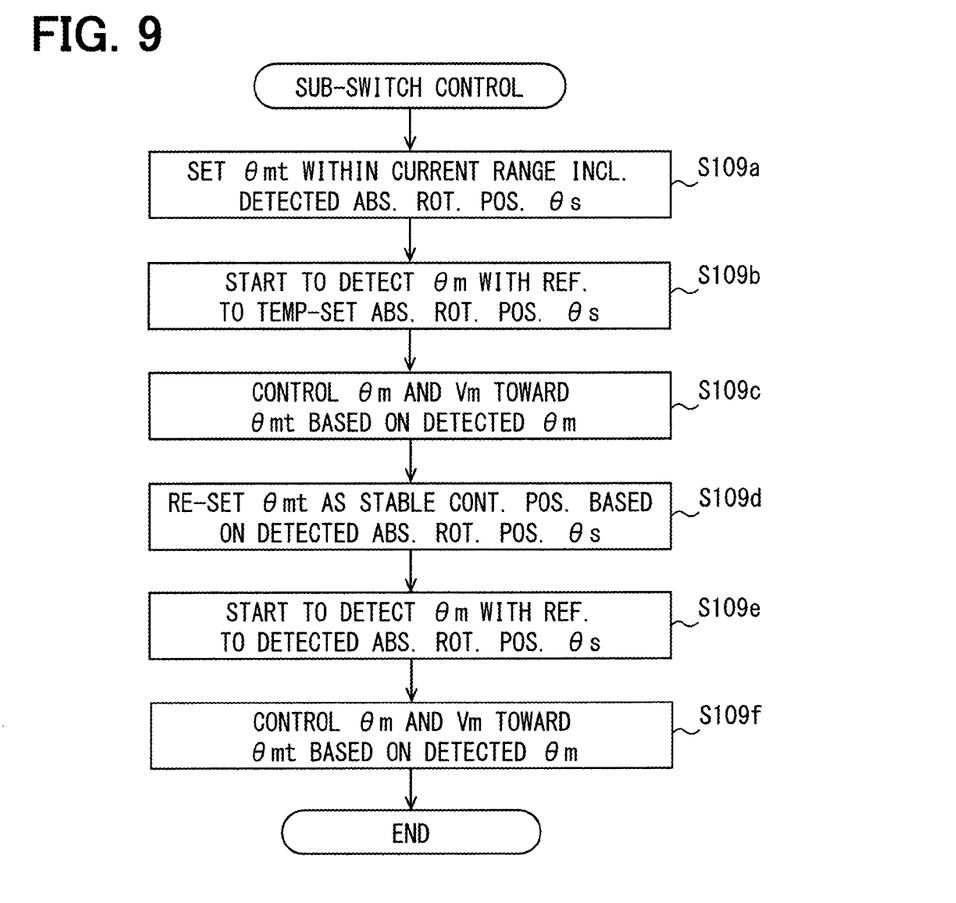
FIG. 9 is a flowchart of a sub-switch control in the first embodiment of the present disclosure.

More practically, the sub-switch control sets, in S109a of FIG. 9, the target rotation position θmt according to the shift position switch instruction based on the current shift position realize range corresponding to (i.e., that includes) the detected absolute rotation position θs.

At such time, based on the output signals Sp, Sr, Sn and Sd from the absolute rotation position detector 50, a shift position realize range corresponding to the sensing part that is currently picking up the ON voltage of one of the detection signals Sp, Sr, Sn, Sd is detected as the "current" shift position realize range including the detected absolute rotation position θs of the output shaft 26, which may also be designated as a "CURRENT RANGE INCL. DETECTED ABS. ROT. POS. θs", in short as shown in FIG. 9.

Figure 10:
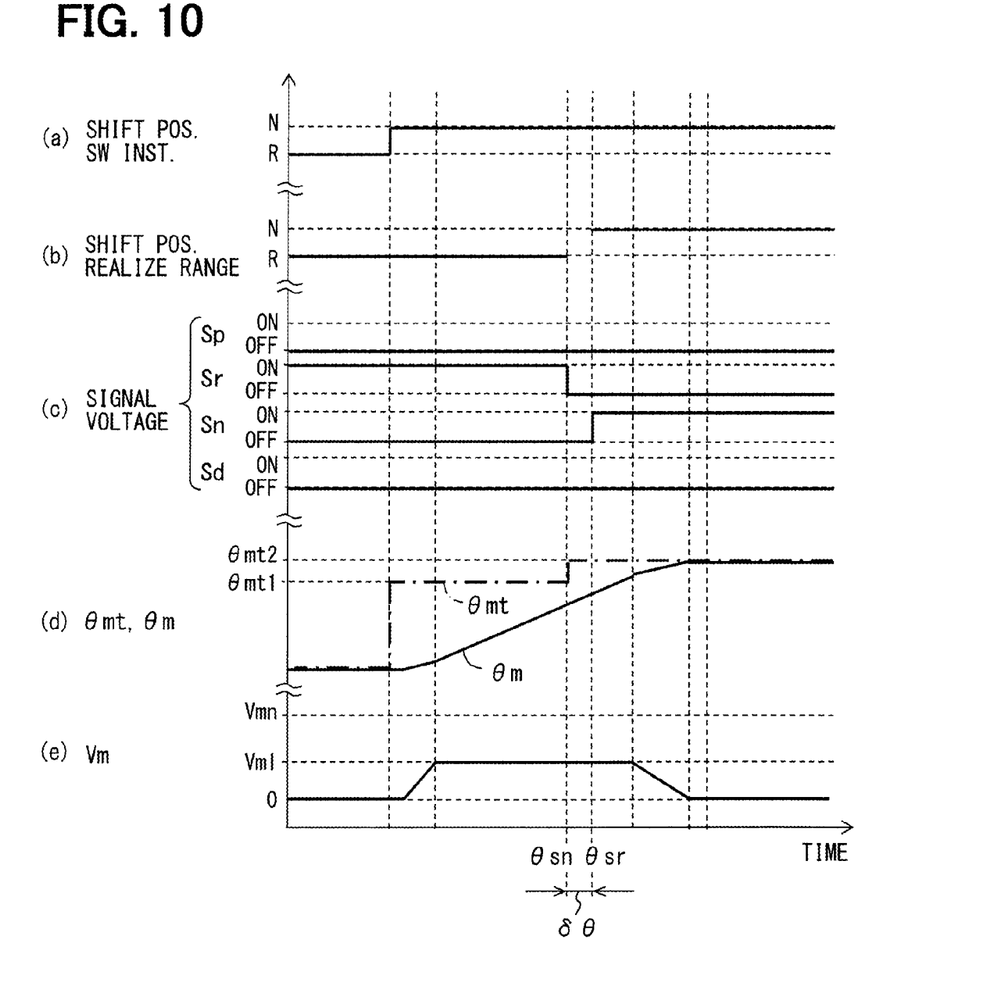
FIG. 10 is a diagram of characteristic operations of the sub-switch control in the first embodiment of the present disclosure.

Then, the current position is temporarily set (i.e., is assumed) as a position within the "current" shift position realize range including the detected absolute rotation position θs described in the above, and the target rotation position θmt is set as a rotation count value which falls within the shift position realize range of the post-switch shift position when the absolute rotation position θs changes (i.e., rotates), as shown in FIG. 10, from such temporarily-set (i.e., assumed) current position.

In such manner, the target rotation position θmt is set to prevent both of the overshoot and the undershoot relative to the shift position realize range of the post-switch shift position.

Note that, in FIG. 10, the target rotation position θmt set in S109a is specifically illustrated as a target rotation position θmt1.

Next, as shown in FIG. 9, in S109b of the sub-switch control, the rotation count value from the absolute rotation position θs temporarily set in S109a is detected as a rotation position θm with reference to such a temporarily-set position θs that serves as a rotation start position. That is, in S109b, the shift position switch control starts to detect the rotation position θm with reference to the temporarily-set position θs.

In subsequent S109c, the rotation position θm and the rotation speed Vm of the electric motor 22 are controlled toward a position within the shift position realize range of the post-switch shift position, which is set as the target rotation position θmt.

At such time, the rotation count value based on the output signal from the rotation position detector 40 is detected as needed as the current rotation position θm with reference to the absolute rotation position θs which is temporarily set in S109a.

Then, a feedback control about the rotation position θm is performed so that the current position detected as needed is matched with (i.e., is brought to) the target rotation position θmt.

At such time, the rotation speed Vm of the electric motor 22 is regulated to a regulated speed Vml that is lower than the normal speed Vmn in S105f of the learn control and in S108b of the main switch control as shown in FIG. 10.

Further, as shown in FIG. 9, in S109d of the sub-switch control, the target rotation position θmt according to the shift position switch instruction is re-set to the stable control position within the shift position realize range of the post-switch shift position in the shift position switch instruction, based on the detected rotation position θm.

At such time, when the control of S109c advances, either of the extreme position θsn or θsr is detected as the current absolute rotation position θs of the output shaft 26 based on one of the output signals Sp, Sr, Sn and Sd from the absolute rotation position detector 50.

Then, the target rotation position θmt is set as the rotation count value which enables to bring the detected rotation position θm from the current position (i.e., to rotate) to the stable control position as shown in FIG. 10.

Note that, in FIG. 10, the target rotation position θmt set in S109d is specifically illustrated as a target rotation position θmt2.

Further, the process in FIG. 10 is an example of setting the target rotation position θmt2 according to the detection of the extreme position θsn as the absolute rotation position θs based on the output signal Sr from the sensing part 50r corresponding to the reverse position, i.e., R position, which is a pre-switch shift position in the shift position switch instruction. That is, the shift position switch control in this case switches the shift position from R position to N position.

Further, as shown in FIG. 9, in S109e of the sub-switch control, the rotation count value from the absolute rotation position θs detected in S109d is detected, i.e., is started to be detected, as the rotation position θm with reference to such rotation position θs that serves as a rotation start position.

Then, in S109f of the sub-switch control, the rotation position θm and the rotation speed Vm of the electric motor 22 are controlled toward the stable control position which is set as the target rotation position θmt based on the detected rotation position θm.

At such time, the rotation count value based on the output signal from the rotation position detector 40 is detected as needed as the current rotation position θm with reference to the absolute rotation position θs detected in S109d, which serves as a rotation start position.

Then, a feedback control about the rotation position θm is performed so that the current position detected as needed may be matched with (i.e., is brought to) the target rotation position θmt.

Further, at such time, the rotation speed Vm of the electric motor 22 is once regulated to the regulated speed Vml just like S109c, and is then regulated to a further-lower regulated speed that is lower than the regulated speed Vml, as shown in FIG. 10.

More specifically, in the present embodiment, after the detection of the absolute rotation position θs corresponding to the post-switch shift position of the shift position switch instruction, the rotation speed Vm is regulated to the regulated speed Vml for a preset angle δθ, and is then further lowered so that the rotation speed Vm departs, i.e., lowers, gradually from the regulated speed Vml.

Note that, the process in FIG. 10 is an example of lowering of the rotation speed Vm further lowered from the regulated speed Vml used for the preset angle δθ, after detecting the extreme position θsr as the absolute rotation position θs based on the output signal Sn from the sensing part 50n, indicating that the post-switch shift position is N position.

In such manner, when the sub-switch control is complete, in the shift position switch control, the process proceeds to S106 as shown in FIG. 5.

Based on the description in the above, it is understood that a function block in the control circuit 60 for performing S105a, S105e, S108a, S109a, and S109d corresponds to a reference position learner in the claims, and a function block in the control circuit 60 for performing Sxxx corresponds to a target position setter in the claims. Further, a function block in the control circuit 60 for performing S105b, S105f, S108b, S109c, and S109f corresponds to a rotation control section in the claims.

(Operation Effects)

The operation effects of the first embodiment described above are described in the following.

According to the first embodiment of the present disclosure, until the first condition C1 that the learned reference rotation position θm0 is initialized in the reference shift position (P position) is satisfied, the target rotation position θmt of the electric motor 22 is set based on the absolute rotation position θs of the output shaft 26 detected by the absolute rotation position detector 50.

Further, until the second condition C2 that the post-switch shift position in the shift position switch instruction inputted after the initialization of the learned reference rotation position θm0 is P position, i.e., the reference shift position is satisfied, the target rotation position θmt is set based on the absolute rotation position θs detected by the absolute rotation position detector 50.

According to the above, the rotation position θm of the electric motor 22 is controlled toward the target rotation position θmt based on the detected absolute rotation position θs until the reference rotation position θm0 becomes accurately learnable which serves as a rotation start position of the detected rotation position θm.

Therefore, the overshoot and undershoot of the rotation position θm of the electric motor 22 relative to the target rotation position θmt are restricted/controlled to the minimum.

Furthermore, according to the first embodiment, after the satisfaction of the first condition C1 or the second condition C2, the target rotation position θmt of the electric motor 22 is set based on the rotation position θm detected by the rotation position detector 40, with reference to the reference rotation position θm0 serving as the rotation start position.

According to the above, after the reference rotation position θm0 is accurately learnable as the rotation start position for the detection of the rotation position θm, the rotation position θm of the electric motor 22 is controlled toward the target rotation position θmt based on such, accurately-learned, reference rotation position θm0.

Therefore, the overshoot and undershoot of the rotation position θm of the electric motor 22 relative to the target rotation position θmt are securely prevented.

Based on the above, in the first embodiment of the present disclosure, the rotation position θm of the electric motor 22 is accurately controllable to the target rotation position θmt, and the accuracy of the shift position switch control is secured.

Further, in the first embodiment, until the first condition C1 or the second condition C2 is satisfied, the rotation speed of the electric motor is regulated to the regulated speed Vml that is lower than the rotation speed after the satisfaction of the first condition C1 or the second condition C2, which makes it easy to control the rotation position to the target rotation position θmt.

According to the above, the overshoot/undershoot of the rotation position θm of the electric motor 22 relative to the target rotation position θmt is further easily controllable to the minimum, thereby securing the accuracy of the shift position switch control of the present disclosure.

Furthermore, in the first embodiment, after the detection of the absolute rotation position θs corresponding to the post-switch shift position in the shift position switch instruction until the first condition C1 or the second condition C2 is satisfied, the rotation speed Vm of the electric motor 22 is controlled to a further-lower rotation speed than the regulated speed Vml.

According to the above, while a required time for controlling the rotation position to the target rotation position θmt is reduced until the detection of the absolute rotation position θs corresponding to the post-switch shift position, the control of the rotation position to the target rotation position θmt is made easier thereafter, i.e., after the detection of the absolute rotation position θs corresponding to the post-switch shift position until the satisfaction of the first or second condition.

According to the above, the overshoot/undershoot of the rotation position θm of the electric motor 22 relative to the target rotation position θmt is securely preventable, thereby improving the reliability of the accuracy securing effect of the shift position switch control of the present disclosure.

In addition, in the first embodiment, after the satisfaction of the first condition C1 or the second condition C2, prior to the setting of the target rotation position θmt, the target rotation position θmt is set to a different position from the detection position based on the rotation position θm detected with reference to the reference rotation position θm0 serving as the rotation start position.

More specifically, the target rotation position θmt is set as the temporary rotation position θm to a far side position on a far side of the reference rotation position θm0, when seen from the current position.

In such manner, the rotation position θm of the electric motor 22 reaches the reference rotation position θm0 in a course of rotation from the current position toward the target rotation position θmt that is on the far side of the reference rotation position θm0, thereby enabling the controller 1 to accurately learn the reference rotation position θm0 during the rotation toward the target rotation position θmt.

That is, by setting the target rotation position θmt based on the rotation position θm that is detected with reference to the reference rotation position θm0 accurately learned as the rotation start position in the above-described manner, the rotation position control of the electric motor 22 is accurately performable, and the accuracy of the shift position switch control is securable.

Furthermore, according to the stopper 32s in the first embodiment, the electric motor 22 is mechanically stopped from rotating beyond the reference rotation position θm0. In such manner, the rotation position θm of the electric motor 22 is stopped by the stopper 32s, in the course of rotation from the current position to the target rotation position θmt on the far side of the reference rotation position θm0, at the moment of reaching the reference rotation position θm0, thereby enabling the controller 1 to easily learn the reference rotation position θm0 during the rotation toward the target rotation position θmt.

Therefore, by setting the target rotation position θmt based on the rotation position θm detected with reference to the reference rotation position θm0, which has been easily learned as the rotation start position in the above-described manner, the rotation position control of the electric motor 22 is accurately performable by the controller 1, thereby improving the reliability of the accuracy securing effect of the shift position switch control of the present disclosure.

Second Embodiment

The second embodiment of the present disclosure is a modification of the first embodiment.

Figure 11:
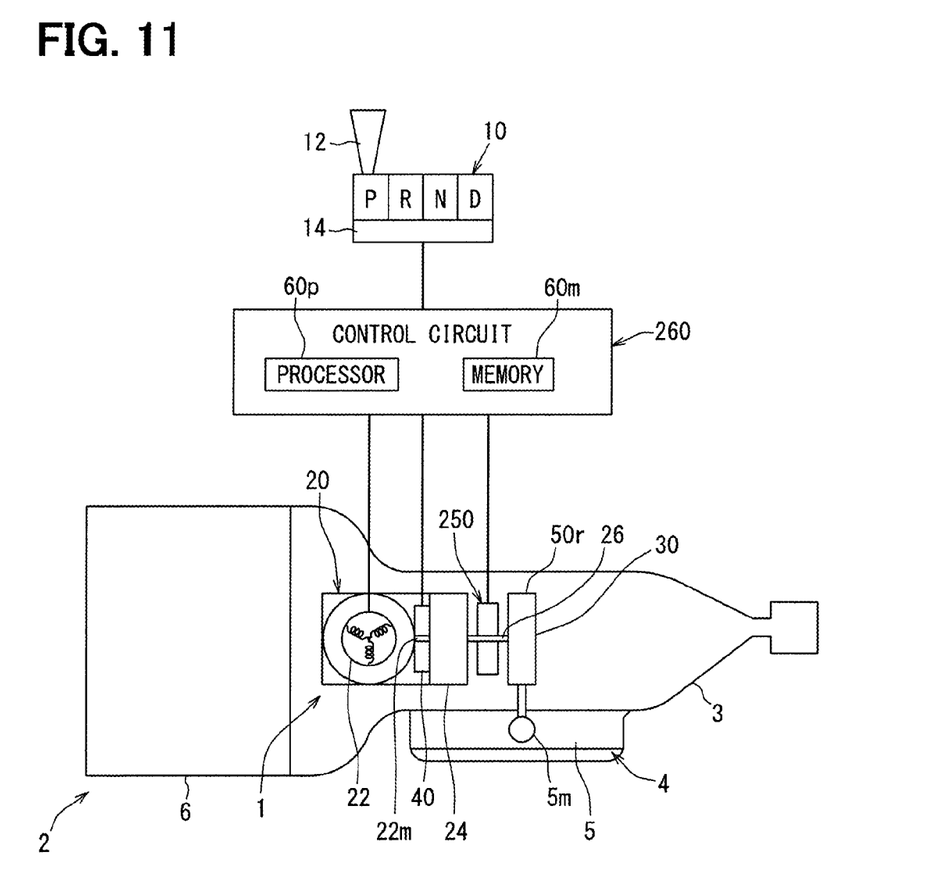
FIG. 11 is a block diagram of the shift-by-wire system including the shift position switch controller in a second embodiment of the present disclosure.

As shown in FIG. 11, an absolute rotation position detector 250 in the second embodiment is a potentiometer, and is disposed in proximity of the output shaft 26.

Figure 12:
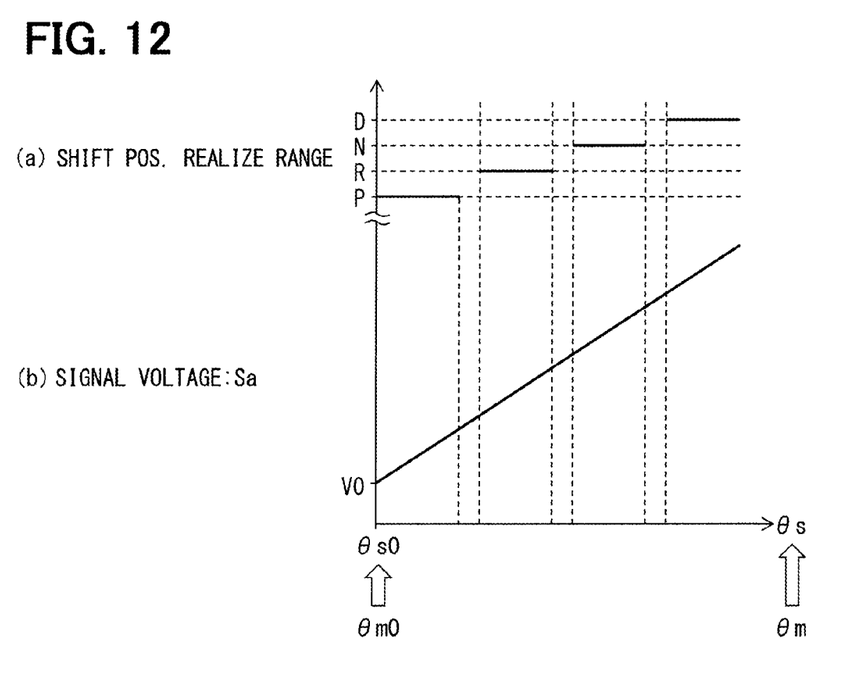
FIG. 12 is a diagram of characteristic operations of the absolute rotation position detector in the second embodiment of the present disclosure.

As shown in FIG. 12, in proportion to the rotation angle of the output shaft 26 increasing in the forward rotation direction from the extreme position θs0 corresponding to the reference rotation position θm0, the voltage of a detection signal Sa outputted from the absolute rotation position detector 250 also increases from a minimum value V0.

Then, a control circuit 260 in the second embodiment detects the absolute rotation position θs of the output shaft 26 substantially continuously by picking up the voltage of the output signal Sa from the absolute rotation position detector 250.

In the second embodiment, instead of performing an above-described process of S101, S109a, and S109d based on the output signals Sp, Sr, Sn and Sd from the absolute rotation position detector 50, the process of S101, S109a, and S109d is performed based on the output signal Sa from the absolute rotation position detector 250.

More specifically, the current absolute rotation position θs in S109a is directly detected based on the voltage of the output signal Sa from the absolute rotation position detector 250.

Therefore, in S109a, the target rotation position θmt is set as the rotation count value which falls within the shift position realize range of the post-switch shift position when the absolute rotation position θs changes from the detected, current absolute rotation position θs.

That is, in S109a, the target rotation position θmt is set based on the detected absolute rotation position θs.

Further, more specifically, the current absolute rotation position θs in S109d is continuously detected based on the voltage of the output signal Sa from the absolute rotation position detector 250.

Therefore, in S109d, the target rotation position θmt is set as the rotation count value that corresponds to rotation from the current absolute rotation position θs detected immediately after the start of control in S109c to the absolute rotation position θs corresponding to the stable control position.

According to such configuration of the second embodiment, the same operation effects as the first embodiment are achievable.

Further, according to the second embodiment, by using the absolute rotation position detector 250 that is capable of substantially continuously detecting the absolute rotation position θs of the output shaft 26, the absolute rotation position θs is accurately detectable even from the initial stage (i.e., S109a) of the sub-switch control, for the setting of the target rotation position θmt.

Therefore, the rotation position control of the electric motor 22 is accurately performable, thereby improving the reliability of the accuracy securing effect of the shift position switch control of the present disclosure.

Other Embodiments

Although the present disclosure has been described in connection with preferred embodiment thereof with reference to the accompanying drawings, it is to be noted that various changes and modifications will become apparent to those skilled in the art.

For example, as a modification 1, the rotation speed Vm of the electric motor 22 in S109c and S109f may both be controlled to the normal speed Vmn instead of being regulated to the regulated speed Vml.

Also, as a modification 2, the rotation speed Vm of the electric motor 22 may be controlled to the normal speed Vmn in S109c, i.e., until the detection of the absolute rotation position θs corresponding to the post-switch shift position in the shift position switch instruction, and the rotation speed Vm of the electric motor 22 may be regulated to the regulated speed Vml in S109f, i.e., after the detection thereof.

Also, as a modification 3, the rotation speed Vm of the electric motor 22 may be kept unchanged from the regulated speed Vml, i.e., without lowering from the regulated speed Vml, in S109f.

As a modification 4, the reference rotation position θm0 may be defined as the stable control position within the shift position realize range of the rotation position θm which realizes P position that serves as a reference shift position.

In such case, among the steps in the learn control S105 of the shift position switch control, S105a, S105b, S105e, and S105f become unnecessary, and the rotation position θm during performing S105c is learned as the reference rotation position θm0.

As a modification 5, a structure other than a lever-type, e.g., a paddle type structure, a button type structure and the like, may be adopted as the shift position selector 10.

As a modification 6, a shift position other than the park position P, e.g., D position, may be adopted as the reference shift position.

As a modification 7, the present disclosure may be applicable, for example, to the automatic transmission 3 having more than four shift positions, e.g., the automatic transmission may have the second shift position and the low shift position, besides the four shift positions, P, R, N, and D.

Such changes, modifications, and summarized schemes are to be understood as being within the scope of the present disclosure as defined by appended claims.

What is claimed is:

1. A shift position switch controller that performs a switch control a transmission, comprising:
   a rotation position detector detecting a rotation position of an electric motor;
   an absolute rotation position detector detecting an absolute rotation position of an output shaft;
   a reference position learner learning a reference rotation position of the electric motor in a reference shift position, the reference shift position being one of a plurality of shift positions;
   a target position setter that
   (A) sets a target rotation position of the electric motor according to a shift position switch instruction that is based on the absolute rotation position detected by the absolute rotation position detector, until a satisfaction of a first condition or a second condition, and
   (B) sets the target rotation position according to a shift position switch instruction that is based on the rotation position that is detected by the rotation position detector, with reference to the reference rotation position serving as a rotation start position, after the satisfaction of the first condition or the second condition, wherein
   the first condition is defined as an initialization of a learned reference rotation position learned by the reference position learner in the reference shift position, and
   the second condition is defined as a post-switch shift position being set as the reference shift position in the shift position switch instruction that is input after the initialization of the learned reference rotation position; and
   a rotation controller controlling the rotation position of the electric motor toward the target rotation position, based on a detected rotation position detected by the rotation position detector.

2. The shift position switch controller of claim 1, wherein the rotation controller regulates a rotation speed of the electric motor under a regulated speed until a satisfaction of the first condition or the second condition, the regulated speed being lower than a rotation speed after the satisfaction of the first condition or the second condition.

3. The shift position switch controller of claim 2, wherein the rotation control section controls the rotation speed of the electric motor to a further-lower regulated speed, after a detection of the absolute rotation position by the absolute position detector corresponding to a post-switch shift position in the shift position switch instruction, until the first condition or the second condition is satisfied, the further-lower regulated speed being lower than the regulated speed.

4. The shift position switch controller of claim 1, wherein the target position setter sets, prior to setting the target rotation position, a temporary target rotation position to a far side position on a far side of the reference rotation position that is based on the detected rotation position detected by the rotation position detector with reference to the rotation start position, after the first condition or the second condition is satisfied.

5. The shift position switch controller of claim 4 further comprising:
   a stopper mechanically stopping a rotation of the electric motor beyond the reference rotation position.

* * * * *